United States Patent [19]
Boet

[11] Patent Number: 5,377,534
[45] Date of Patent: Jan. 3, 1995

[54] GROUND TEST INSTALLATION FOR THE JET ENGINES OF AN AIRLINER

[75] Inventor: Jean-Paul Boet, Villeneuve d'Ascq, France

[73] Assignee: Societe Anonyme dite: S.A. Andre Boet, Villeneuve d'Ascq, France

[21] Appl. No.: 967,705

[22] Filed: Oct. 28, 1992

[30] Foreign Application Priority Data

Nov. 6, 1991 [FR] France ................ 91 13696

[51] Int. Cl.⁶ .............................................. B64F 1/26
[52] U.S. Cl. ........................................ 73/116; 181/203; 181/217; 181/218; 181/210
[58] Field of Search ................ 73/116; 181/198, 203, 181/205, 210, 213, 214, 215, 216, 217, 218, 219, 222

[56] References Cited

U.S. PATENT DOCUMENTS

| | | | |
|---|---|---|---|
| 2,685,936 | 8/1954 | Brenneman et al. | 181/218 |
| 2,798,743 | 7/1957 | Olesten | 181/218 |
| 2,942,682 | 6/1960 | Bergh et al. | 181/218 |
| 3,525,418 | 8/1970 | Smith et al. | 181/218 |
| 3,630,313 | 12/1971 | Smith | 181/218 |
| 3,842,941 | 10/1974 | Gerber | 181/218 |
| 4,987,970 | 1/1991 | Boet | 181/217 |

FOREIGN PATENT DOCUMENTS

| | | | |
|---|---|---|---|
| 0147962 | 11/1974 | Canada | 181/203 |
| 1582107 | 9/1969 | France | |
| 0774550 | 5/1957 | United Kingdom | 181/203 |
| 1309224 | 3/1973 | United Kingdom | |

OTHER PUBLICATIONS

Lemmerman and Callaway, "Aircraft Run-Up Silencing Design", *Noise Control*, vol. 2, No. 1, Jan. 1956, pp. 10–14 and 65.

*Popular Science*, Oct. 1956, pp. 126–127.

*Primary Examiner*—Hezron E. Williams
*Assistant Examiner*—George M. Dombroske
*Attorney, Agent, or Firm*—Marshall, O'Toole, Gerstein, Murray & Borun

[57] ABSTRACT

The present invention relates to a ground test installation for the jet engines (5A, 5B) of an airliner (2) equipped with at least two jet engines linked to the wings of the aircraft, comprising, for each jet engine (5A, 5B), a silencer (8A, 8B) having a body of generally cylindrical elongate shape, said silencers being intended to each be arranged behind the nozzle of one of said jet engines. According to the invention, this installation comprises a casing (6) which is acoustically insulating and permeable to air, intended to envelop at least the front part of the fuselage (3) and the wings (4A, 4B) of the aircraft (2), and the rear wall of which (7A, 7B) is connected to the front end part of each of said silencers (8A, 8B).

11 Claims, 7 Drawing Sheets

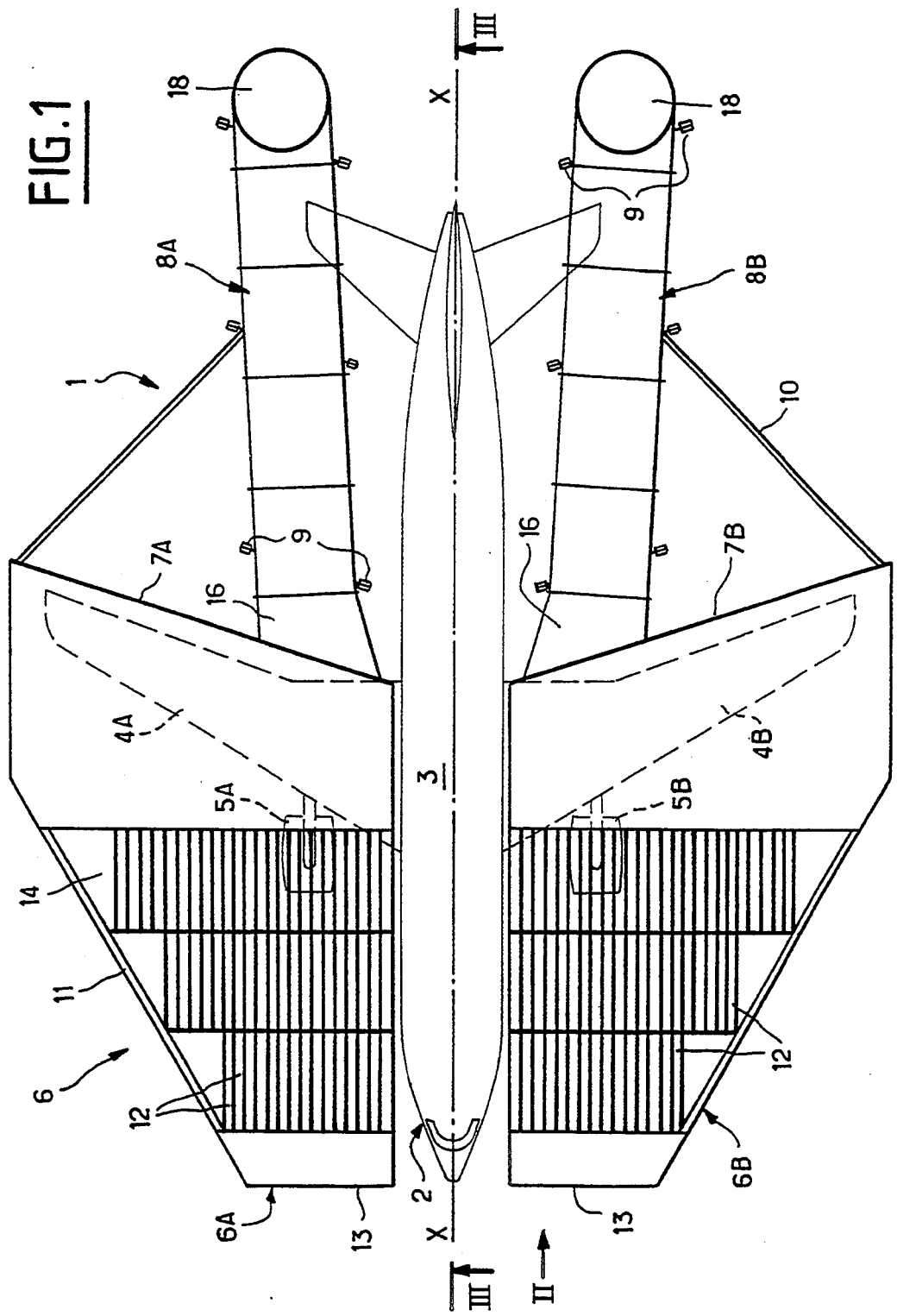

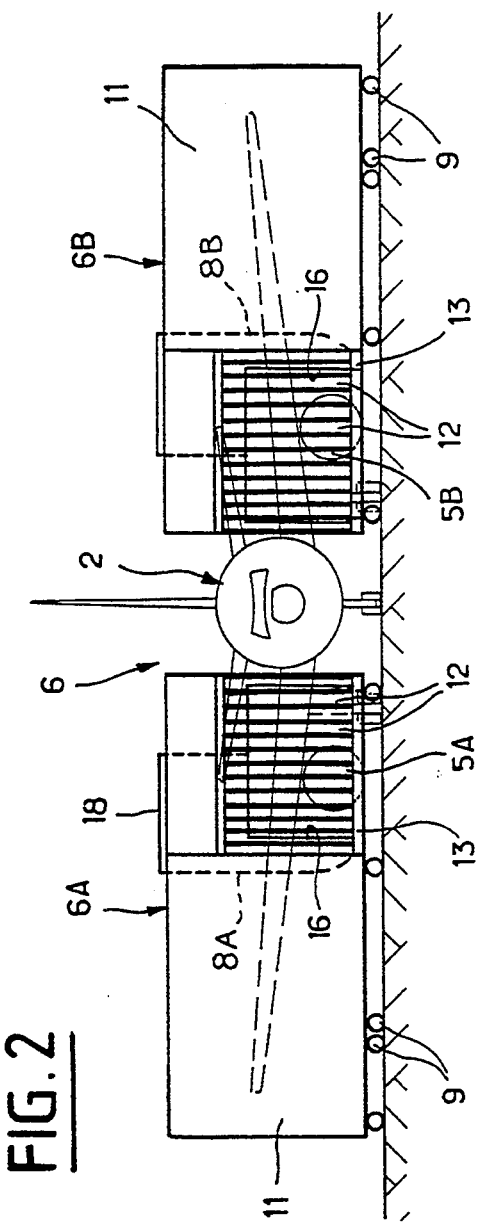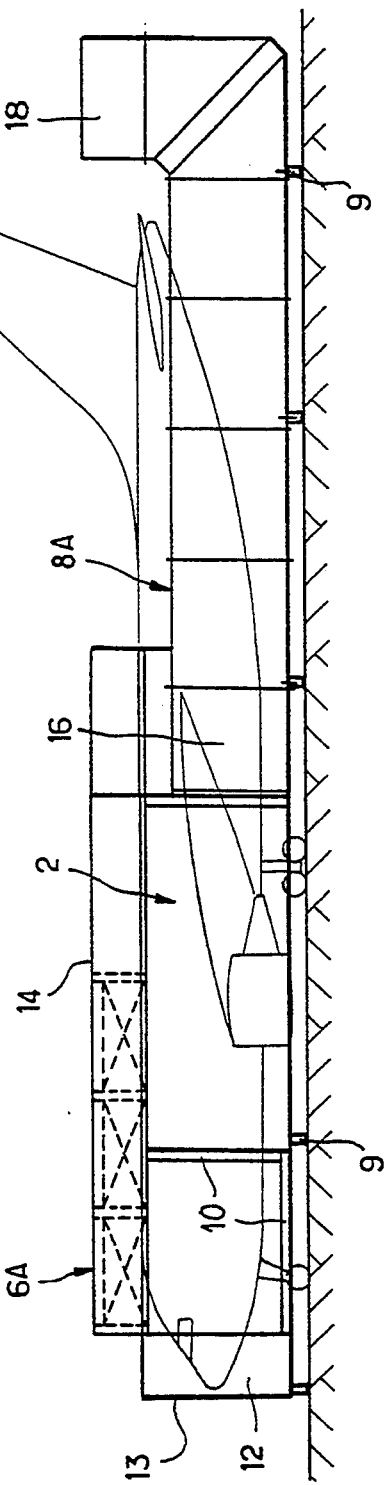

GROUND TEST INSTALLATION FOR THE JET ENGINES OF AN AIRLINER

The present invention relates to a ground test installation for the jet engines of an airliner equipped with at least two jet engines linked to the wings of the aircraft.

At the various stages of the construction and/or of the maintenance of an aircraft, ground tests have to be carried out on the jet engine or engines equipping said aircraft. Such tests, carried out on a fixed area provided for this purpose, give rise to a nuisance linked mainly to the noise generated by the jet engine or jet engines tested at various operating speeds. In order to reduce the noise level in the vicinity of an aircraft whose jet engine or engines are tested, various solutions have been envisaged.

The first solution consists in arranging, behind the nozzle of the engine to be tested, a silencer called "exhaust" silencer, exhibiting a body of generally cylindrically elongate shape. Although giving satisfaction, such silencers leave the possibility for a certain quantity of energy, rich in low frequencies, to diffuse laterally, thus limiting the reduction of the sound level which is capable of being achieved. Moreover, the noise generated at the front of the jet engine, that is to say "on intake", turns out to be as important as the noise generated at the rear ("at the exhaust") with, however, a difference in tonality: high frequency at the intake, low frequency at the exhaust.

Moreover, a change in the wind direction, in the course of a test or between two tests, gives rise to a variation in the results obtained and sometimes even to risks of surge and aerodynamic instability in the region of the compressors and, therefore, malfunctioning of the jet engine or engines, in certain conditions prohibiting tests thereof. In the event of gusts of wind, the risk of damage to the jet engine is all the higher.

In order to overcome these difficulties, a plan has been devised for carrying out such tests in a hangar, allowing the aircraft to be isolated from the external environment. However, although such a solution is completely realistic for small-sized aircraft, such as fighter aircraft, the dimensions necessary for such a hangar become too great, and indeed prohibitive, for an airliner.

The object of the present invention is to avoid these drawbacks, and the invention relates to a ground test installation for the jet engines of an airliner, adapted to take advantage of the flexibility of use of the first solution described above, while at the same time avoiding its own drawbacks and those linked to the construction of a building whose dimensions and cost, for such a type of aircraft may, in certain cases, be considered as ruling it out.

To this end, the ground test installation for the jet engines of an airliner equipped with at least two jet engines linked to the wings of the aircraft, of the type comprising, for each jet engine, a silencer having a body of generally cylindrical elongate shape, said silencers being intended to each be arranged behind the nozzle of one of said jet engines, is noteworthy according to the invention in that it comprises a casing which is acoustically insulating and permeable to air, intended to envelop at least the front part of the fuselage and the wings of the aircraft, and whose rear wall is connected to the front end part of each of said silencers.

Hence, said casing girdling the whole of the front part of the aircraft makes it possible to limit the acoustic leaks to a minimum, while obtaining a uniform acoustic performance all around the installation, in cooperation with said silencers, and this is achieved without it being necessary to construct hangars the cost and dimensions of which for airliners would be, as already indicated, considered as ruling them out. Moreover, the effects of the wind are totally eliminated by virtue of the casing, which makes it possible to carry out the tests in practically all weathers.

In accordance with a first exemplary embodiment of the invention, said casing is constituted by two half-casings which are movable with respect to one another in order to allow entry of the aircraft into said casing and its exit from the latter, each of said half-casings being integral with at least one silencer. Advantageously, said half-casings are movable with respect to each other transversely to the longitudinal axis X—X of said installation.

In particular, the movement of said half-casings can be provided by bearing and driven wheels, connected to said casing, able to move on rails.

On the other hand, in accordance with a second exemplary embodiment of the invention, said casing is formed in a single part, and said rear wall of the casing is constituted by two half-walls each integral with at least one silencer and movable laterally in order to permit the aircraft to enter (or leave) said casing.

Moreover, each of said silencers is equipped with rolling means.

Preferably, the walls of the casing are constituted by structures made of sectional bars on which are fixed acoustically insulating panels.

Advantageously, the front wall as well as the ceiling, at least in its front part, of the casing comprise a plurality of apertures facilitating entry into the casing for the air necessary to supply the jet engines and for the air driven by suction effect. The front part of the casing is thus as permeable as possible, limiting the underpressure in the casing and allowing as natural as possible an air supply to the jet engines.

In particular, said apertures may exhibit the shape of rectangular chimneys, possibly equipped with protection grilles against the entry of foreign bodies (birds, etc.). These chimneys may also be cylindrical and arranged in honeycomb form allowing integration of the structure of the ceiling into the absorbent material.

Moreover, in order to permit free circulation around the jet engines and to permit service personnel to intervene, especially for adjustments, the lower part of the casing is equipped with a slatted floor, in the first embodiment.

The figures of the attached drawing will clearly illustrate how the invention may be embodied. In these figures, identical references designate similar elements.

FIG. 1 is a top view of a first exemplary embodiment of the ground test installation according to the invention, in service position.

FIG. 2 is a front view, along the arrow II, of the installation of FIG. 1.

FIG. 3 is a view in longitudinal section, along the line III—III, of the installation of FIG. 1.

Figure 4:
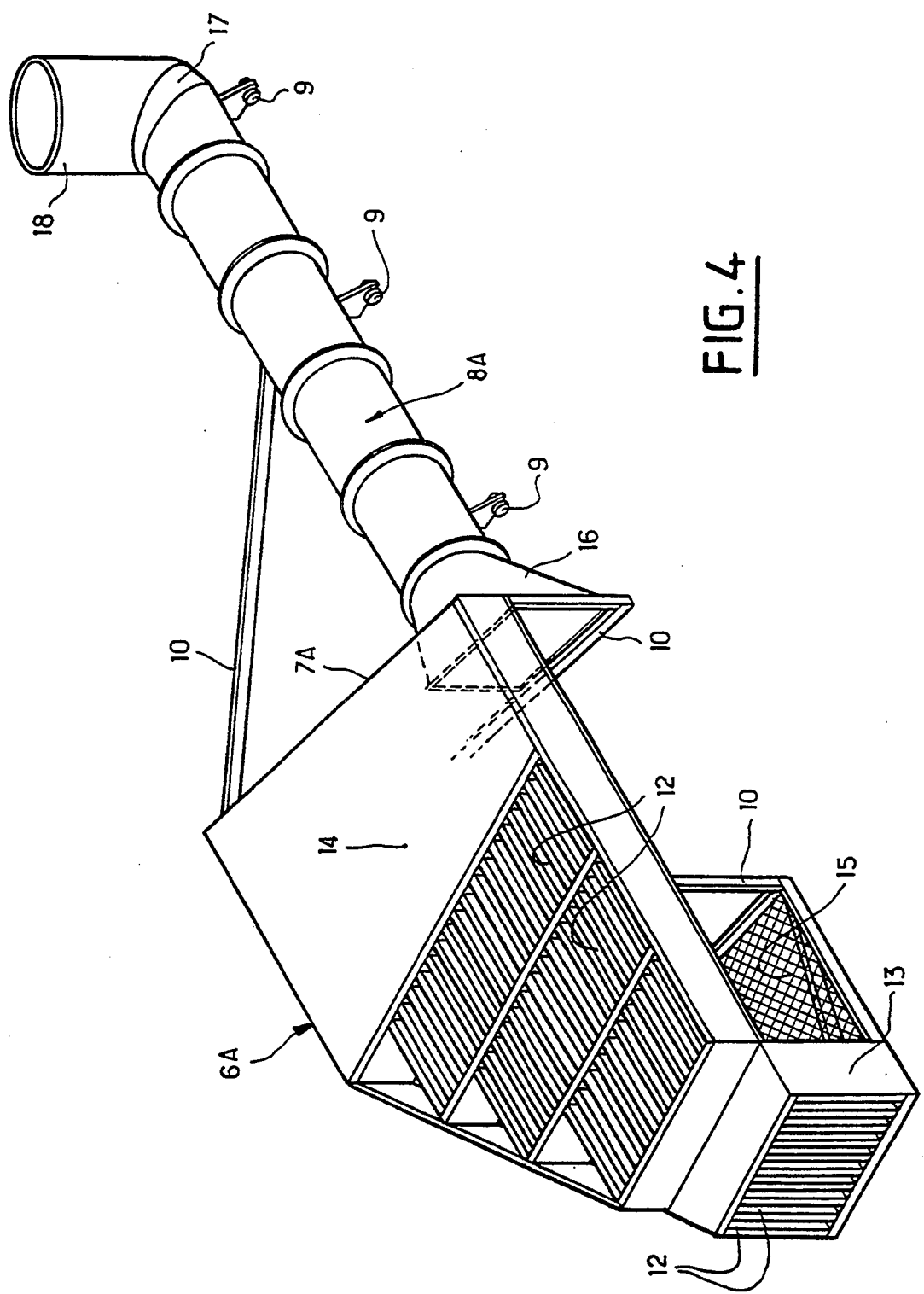
FIG. 4 is a perspective view of a half-casing, and of its silencer, of the installation illustrated by FIGS. 1 to 3.

The two exemplary embodiments of the installation according to the invention described are adapted to carry out ground tests on jet engines of an airliner equipped with two jet engines. However, it is clearly understood that the aircraft on which the tests are carried out may comprise more than two jet engines (for example four), by providing a corresponding number of exhaust silencers in the installation.

A first exemplary embodiment of the installation according to the invention is illustrated by FIGS. 1 to 6.

As is seen in these figures, and especially in FIG. 1, the ground test installation 1 for the jet engines of an airliner 2, which exhibits a fuselage 3 oriented along the longitudinal axis X—X of the installation and a pair of wings 4A, 4B each carrying a jet engine 5A, 5B, comprises a casing 6 which is acoustically insulating and permeable to air, intended to envelop the front part of the fuselage 3 and the wings 4A, 4B of the aircraft 2, and constituted, in this exemplary embodiment, by two half-casings 6A, 6B. The rear wall 7A, 7B of each half-casing 6A, 6B (it being clearly understood that the "front" of the casing corresponds to the front of the aircraft which is arranged therein) is connected to the front end part of a silencer 8A, 8B called exhaust silencer, exhibiting a body of generally cylindrical elongate shape, said silencers 8A, 8B being intended to be each arranged behind the nozzle of the corresponding jet engine 5A, 5B when the installation is in service.

Figure 5:
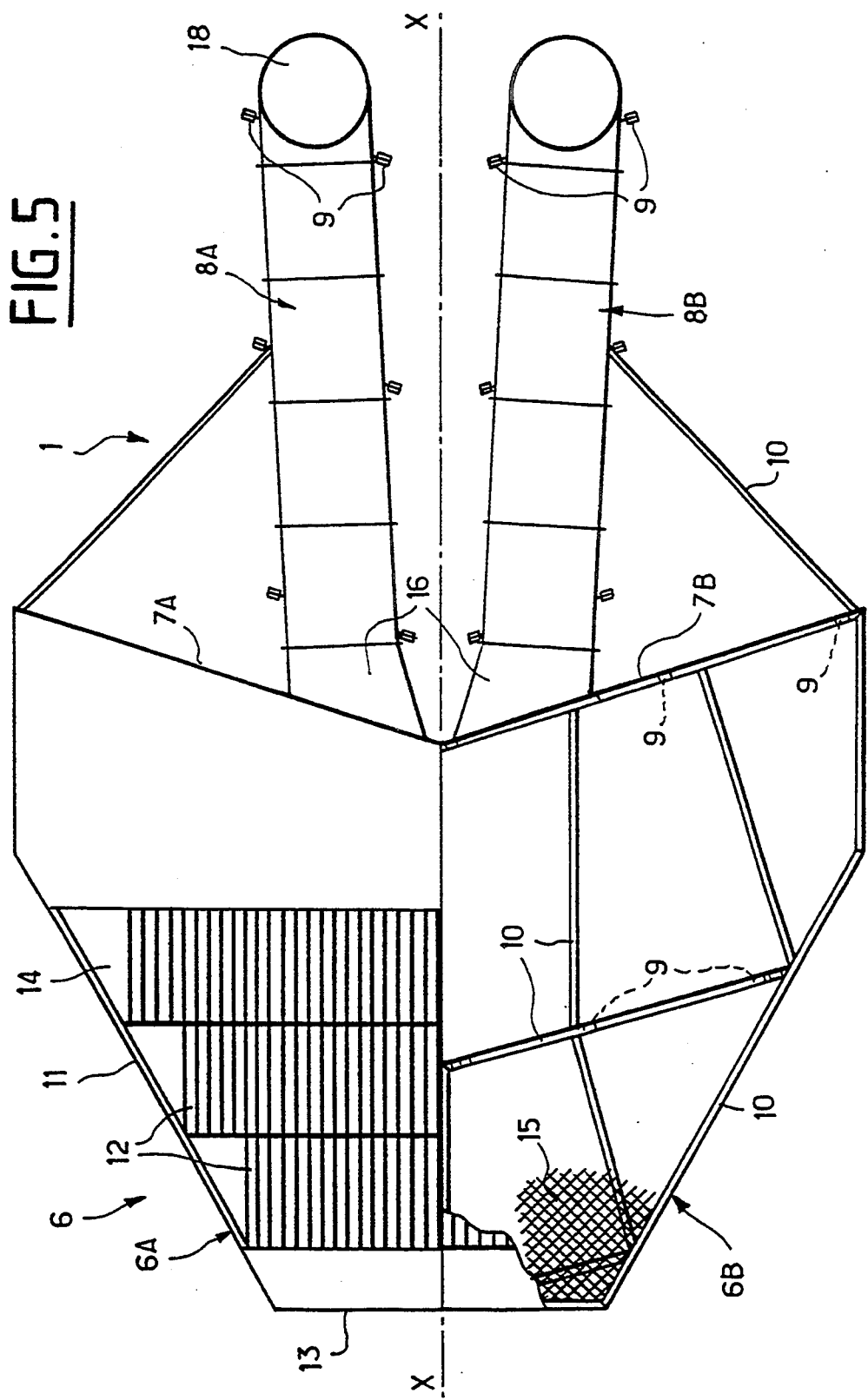
FIG. 5 is a top view, with partial cutaway, of the first exemplary embodiment of the ground test installation according to the invention, in the out-of-service position.
Figure 6:
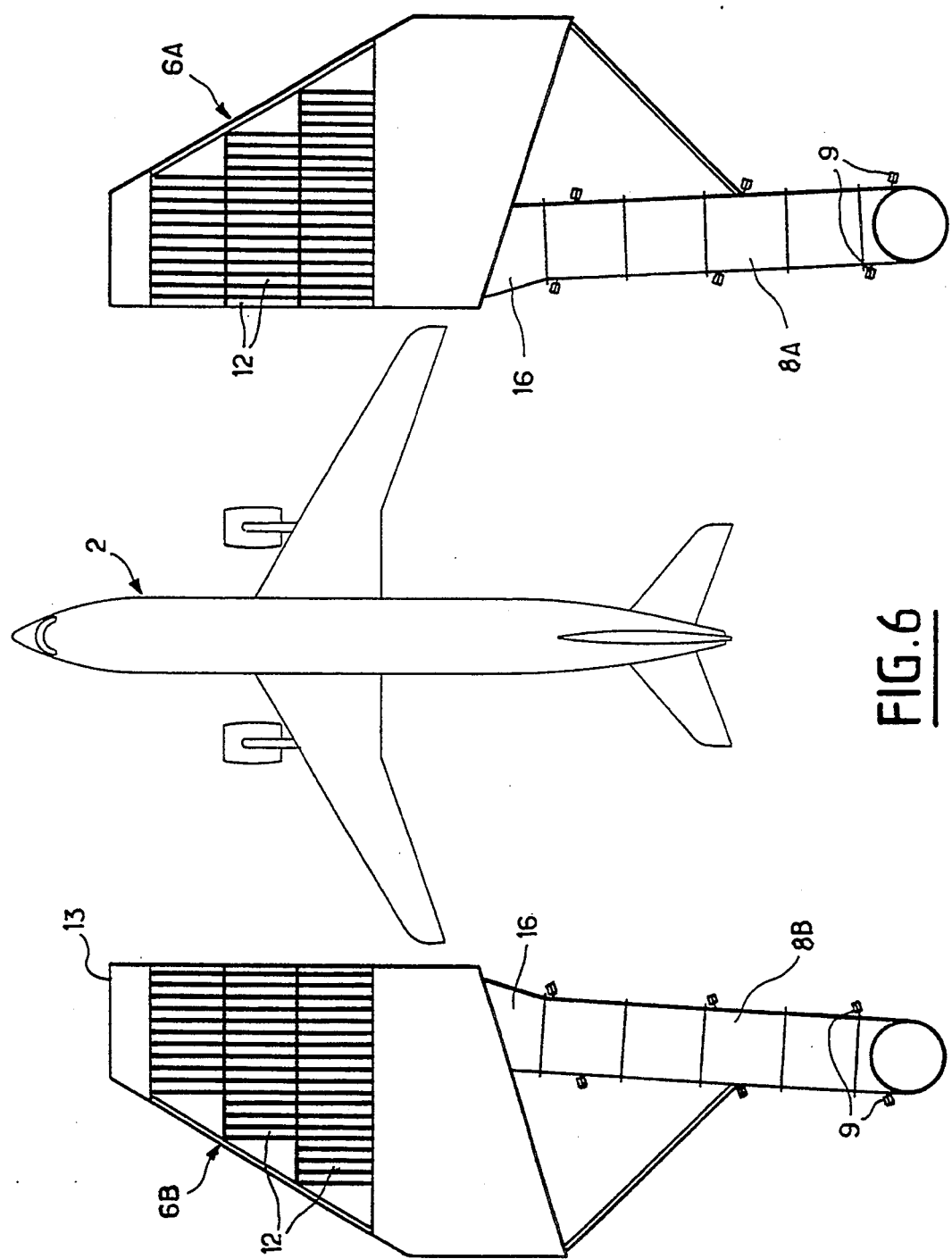
FIG. 6 is a top view showing the installation in the position allowing the entry (or exit) of the aircraft.

Moreover, the two half-casings 6A, 6B, as well as the silencers 8A, 8B which are linked there, are movable transversely to the longitudinal axis X—X of the installation 1, in order to permit entry of the aircraft 2 into the casing 6 and its exit from the latter, as is illustrated more particularly in FIGS. 5 and 6. As already indicated, FIG. 5 shows the installation in the rest or out-of-service position, in which its size is a minimum, the two half-casings 6A, 6B forming a closed assembly. In contrast, in the open position of FIG. 6, the aircraft 2 can easily enter into the installation, or exit from it, possibly through the front. It will be noted that, in service, (FIG. 1), a large or small space may remain between the two half-casings 6A, 6B (although a closed arrangement may equally well be envisaged if the dimensions of the aircraft permit it), without this, needless to say, disturbing the acoustic insulation provided by the casing 6.

The movement of the half-casings 6A, 6B, and of the silencers 8A, 8B, is provided by carrying wheels 9, some of which at least are driven wheels, capable of moving on rails (not represented), and able to use either hydraulic energy or electrical energy.

Moreover, the walls of the casing 6 are constituted by structures made of sectional bars 10, on which are fixed acoustically-insulating panels 11. The air necessary for the supply to the jet engines, as well as the air driven by the suction effect penetrates into the casing 6 by means of a plurality of apertures, advantageously exhibiting the shape of rectangular chimneys 12, provided in the front wall 13, as well as in the ceiling 14, of the casing 6, as can be better seen in FIG. 4. As already indicated, these apertures limit the underpressure in the casing in the course of a test and permit as natural as possible a supply of air to the jet engines. In place of rectangular chimneys (or possibly cylindrical chimneys arranged in a honeycomb form allowing integration of the structure of the ceiling into the absorbent material) equipped with internal devices (not represented) of the acoustic panel type or acoustic coils or rings, there could also be provided, integrated into the partition elements, soundproofed "holes" or soundproofed "shutters". Moreover, in order to prevent entry of foreign bodies into the casing, protection grilles (not represented) may be provided for said air entry apertures 12.

In order to permit free circulation around the jet engines, and intervention by service personnel, the lower part of the casing is equipped with a slatted floor 15 (FIGS. 4 and 5).

Each exhaust silencer 8A, 8B is of the conventional type with, at its intake, a connecting part 16 fixed to the rear wall 7A, 7B of the casing 6 and adapted, by virtue of its positioning and its dimensions, to be able to capture the combusted gas flows as well as the air flows induced by suction effect, whatever type of jet engine is in operation. The position of the axis of each of the silencers is determined to take account of the heaviest gas and air flow rates, and in order to permit blowing of gases and air into the silencer with a minimum angle with respect to the longitudinal axis of the silencer.

Moreover, each silencer is padded internally with sound-absorbent materials, with or without an acoustic core or ring, so as to reduce the outflow noises. The combusted gases are ejected, at the exit, by means of an elbow bend 17 and of a chimney 18. The deflection angle of the elbow bend may be 90° or 135° depending on the conditions of the site, the direction and the force of the prevailing winds, and other factors.

The silencers rest on a metal structure allowing their lateral movement, exactly as for the half-casings, while clearing sufficient space to allow the passage of the aircraft before and after each test, as well as adaptation to each type of aircraft.

Figure 7:
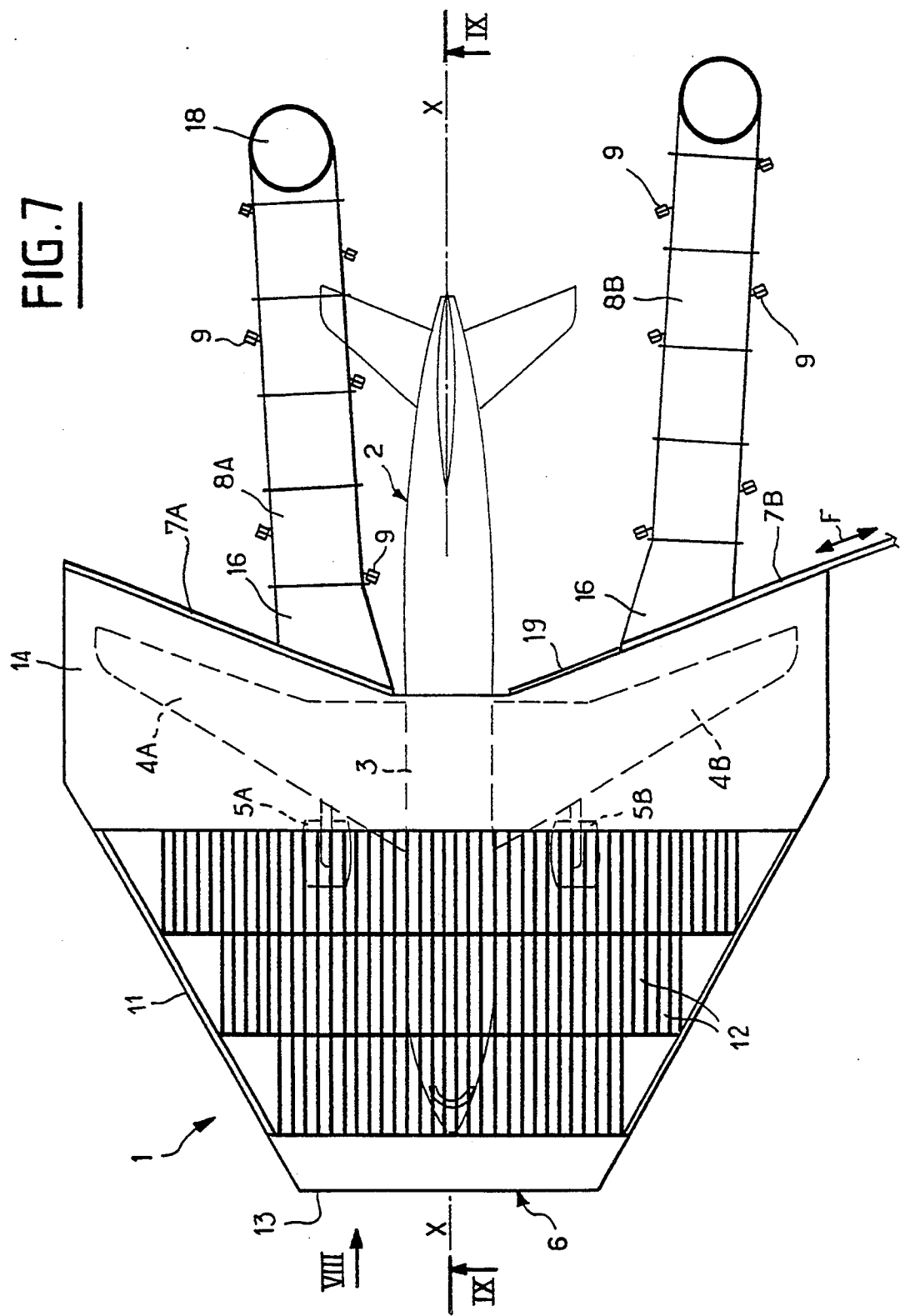
FIG. 7 is a top view of a second exemplary embodiment of the ground test installation according to the invention.
Figure 8:
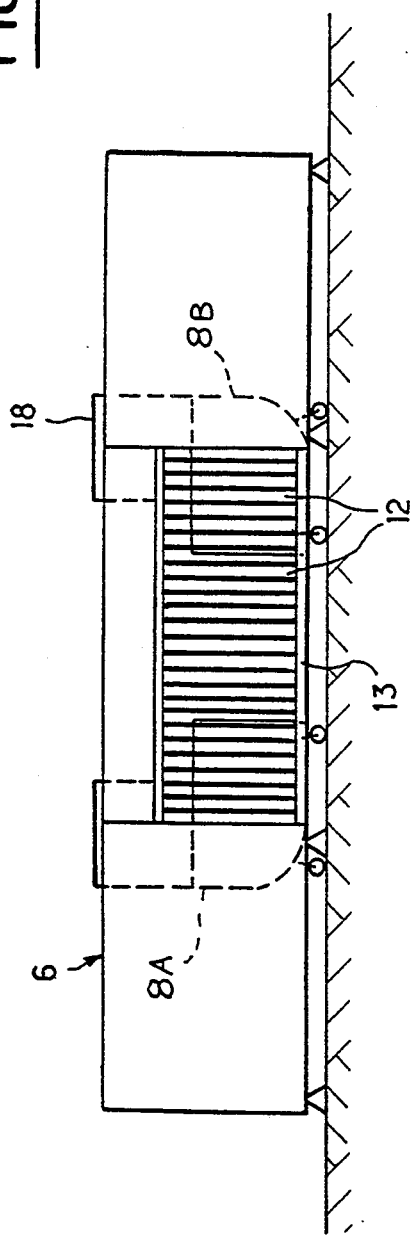
FIG. 8 is a front view, along the arrow VIII, of the installation of FIG. 1.
Figure 9:
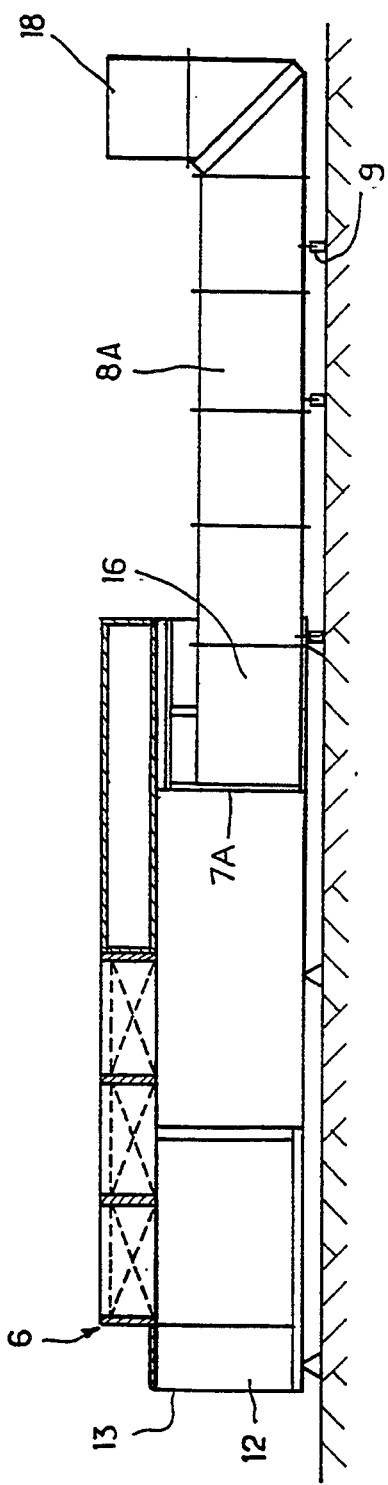
FIG. 9 is a view in longitudinal sectional, along the line IX—IX, of the installation of FIG. 7.

The second exemplary embodiment of the invention is illustrated by FIGS. 7 to 9. In these figures, the same constituent elements are designated by the same numerical references as those of the first exemplary embodiment described above, and the description of these common elements will not be gone over again in detail. Suffice it to say that, as in the preceding case, the installation 1 comprises a casing 6 which is acoustically insulating and permeable to air, intended to envelop the front part of the fuselage 3 and the wings 4A, 4B of the aircraft 2, whose jet engines 5A, 5B have to be subjected to ground tests, a casing whose rear wall 7A, 7B is connected to the front end part of the exhaust silencers 8A, 8B associated with each of the jet engines 5A, 5B. As is seen in FIGS. 7 to 9, the constructional details of the casing 6 (air entry apertures 12 especially) and of the exhaust silencers 8A, 8B are identical to the corresponding ones from the first exemplary embodiment. However, the second exemplary embodiment is distinguished from the first essentially by the fact that, in this case, the casing 6 is formed in a single piece and that the rear wall of the casing, in order then to permit entry of the aircraft into the latter and its exit from the latter, is constituted by two halves 7A, 7B which are integral with the silencers 8A, 8B, respectively, and capable of moving, with the latter, laterally, that is to say in the direction of the double arrow F.

The half-walls 7A, 7B may move on rails (19) in cooperation with rolling means 9 with which the silencers 8A, 8B are equipped. The lower half of FIG. 7 represents the open position of the corresponding half-wall 7B permitting entry ( or exit ) of the aircraft, while the upper half of FIG. 7 represents the closed position (service position) of the half-wall 7A.

As already indicated, the installation according to the invention makes it possible to limit the acoustic leaks as far as possible, while obtaining a uniform acoustic performance around the installation, and eliminating the effects of the wind, which makes it possible to carry out the tests in practically any weather, and, having regard to the excellent sound insulation obtained, even in an urban area.

I claim:

1. A noise-suppressing ground test installation for an aircraft equipped with at least two jet engines linked to the wings of the aircraft,
   said installation comprising, for each jet engine, a silencer (8A, B) having a body of generally cylindrical elongate shape, said silencers being adapted to each be arranged behind the nozzle of one of said jet engines, and
   a casing (6) which is acoustically insulating and permeable to air, adapted to envelop the front part of the fuselage (3) and the wings (4A, 4B) of the aircraft (2),
   said casing having a rear wall (7A, 7B) which is connected to the front end of each of said silencers (8A, 8B).

2. The installation as claimed in claim 1, wherein said casing (6) is constituted by two half-casings (6A, 6B) which are movable with respect to one another in order to allow entry of the aircraft (2) into said casing (6) and its exit from said casing, each of said half-casings (6A, 6B) being integral with at least one silencer (8A, 8B).

3. The installation as claimed in claim 2, wherein said half-casings (6A, 6B) are movable with respect to each other transversely to a longitudinal axis of said installation.

4. The installation as claimed in claim 2 wherein the movement of said half-casings (6A, 6B) is provided by wheels (9), connected to said casing (6), and able to move on rails.

5. The installation as claimed in claim 1, wherein said casing (6) is formed in a single part, and wherein said rear wall of the casing (6) is constituted by two half-walls (7A, 7B) each integral with at least one silencer (8A, 8B) and movable laterally in order to permit the aircraft (2) to enter said casing (6).

6. The installation as claimed in claim 1, wherein each of said silencers (8A, 8B) is equipped with rolling means (9).

7. The installation as claimed in claim 1, wherein the walls of the casing (6) are constituted by structures made of sectional bars (10) on which are fixed acoustically insulating panels (11).

8. The installation as claimed in claim 1, wherein said casing (6) comprises a front wall (13) and a ceiling (14) each containing a plurality of apertures (12) facilitating enter of air into the casing (6).

9. The installation as claimed in claim 8, wherein said apertures exhibit the shape of rectangular or cylindrical chimneys (12).

10. The installation as claimed in claim 8, wherein protection grilles are provided for said apertures (12).

11. The installation as claimed in claim 1, wherein the lower part of the casing (6) is equipped with a slatted floor (15).

* * * * *